United States Patent [19]

Huang

[11] Patent Number: 5,107,801
[45] Date of Patent: Apr. 28, 1992

[54] ELECTROMAGNETIC AUXILIARY EXHAUSTING DEVICE

[75] Inventor: Huei-Huay Huang, Hsinchu, Taiwan

[73] Assignee: Industrial Technology Research Institute, Taiwan

[21] Appl. No.: 657,799

[22] Filed: Feb. 20, 1991

[51] Int. Cl.$^5$ ............................................. F02B 27/06
[52] U.S. Cl. ................................ 123/65 PE; 123/65 V
[58] Field of Search ............... 123/65 A, 65 V, 65 P, 123/65 PE

[56] References Cited

U.S. PATENT DOCUMENTS

| | | | |
|---|---|---|---|
| 2,189,106 | 2/1940 | Garve et al. | 123/65 PE |
| 2,401,858 | 6/1946 | Clark | 123/65 PE |
| 4,121,552 | 10/1978 | Mithuo et al. | 123/65 V |
| 4,903,482 | 2/1990 | Overington et al. | 123/65 PE |
| 5,000,131 | 3/1991 | Masuda | 123/65 PE |

FOREIGN PATENT DOCUMENTS

| | | | |
|---|---|---|---|
| 0025030 | 2/1984 | Japan | 123/65 PE |
| 0035024 | 2/1987 | Japan | 123/65 PE |
| 8808481 | 11/1988 | PCT Int'l Appl. | 123/65 V |

Primary Examiner—David A. Okonsky
Attorney, Agent, or Firm—Sughrue, Mion, Zinn Macpeak & Seas

[57] ABSTRACT

An electromagnetic auxiliary exhausting device enabling a two-stroke engine to have an improved scavenging efficiency and an improved combustion efficiency is provided. The device includes an electromagnetic valve mounted on the engine cylinder, an actuator, and a controller responsive to an operating condition of the engine for controlling the actuator. The valve includes a movable valve needle component having a first seat surface, an immovable valve body having a second corresponding seat surface, a spring for tightly matching the seat surfaces against each other, and a coil energizable by a current pulse outputted from the actuator to result in an electromagnetic force capable of overcoming the force effected by the spring.

4 Claims, 7 Drawing Sheets

ELECTROMAGNETIC AUXILIARY EXHAUSTING DEVICE

BACKGROUND OF THE INVENTION

The present invention relates to an exhausting device, and more particularly to one for a two-stroke engine.

The scavenging process of a two-stroke carburreted gasoline engine is accomplished by using the unburn air fuel mixture to scavenge the residual burnt gas off the cylinder but suffers from the following disadvantages:

1) The new mixture coming from the scavenging ports is partly discharged out of the exhaust port before the closing of the exhaust port; which is so called as the "short-circuitting loss of unburn mixture". Under a low load, the intake new mixture is relatively less and can almost be kept in the cylinder so that the "short-circuitting lose of unburn mixture". Under a low load, the intake new mixture is relatively less and can almost be kept in the cylinder so that the "short-circuitting loss" is relatively small. When the engine has an increasing load and the intake air or mixture is in turn getting more and more, the "short-circuitting loss" is accordingly increasing. As shown in FIGS. 2A and 2B showing a two-stroke engine subjected to a relatively high load, when the piston 37 reached the bottom dead center and begins to upwardly move (as shown in FIG. 2A), the scavenging mixture front 31 continues to flow toward the exhaust port 16 and the upwardly moving piston 37 will compress the cylinder gas which results in that before port 16 is closed by piston 37, some new mixture, which is the source of the short-circuitting loss and will be more if the engine load is larger, has been discharged out of port 16 as schematically shown in FIG. 2B.

2) The new mixture flow cannot effectively scavenge the residual gas off the cylinder; which becomes worse when the engine has a low load or an idle speed since the intake new mixture is relatively less as schematically shown in FIGS. 3A and 3B. When piston 37 reached the bottom dead center and begins to upwardly move as shown in FIG. 3A, the scavenging air front 41 may not reach port 16 since the intake new air flow from the scavenging port 11 is relatively weak. Even after port 16 is closed by piston 37 as shown in FIG. 3B, scavenging air front 41 still may not reach the opposite cylinder wall surface 17 so that the cylinder inevitably contains therein the residual exhaust gas 42 resulted by the last combustion cycle which leads to that the probability of igniting the mixture is reduced, the probability of the misfire of the mixture is increased and the flame propagation speed is also reduced all of which are true for the loop-scavenging type, the cross-scavenging type or the mixed type as respectively shown in FIGS. 1A, 1B and 1C. As an example, the exhaust gas and the new air can have a volume ratio of 55:45 or even higher volume ratio under an idle operation of the engine which is the primary reason that the engine has a low combustion efficiency.

SUMMARY OF THE INVENTION

It is therefore an object of the present invention to provide an auxiliary exhausting device enabling a two-stroke gasoline engine to have an improved scavenging efficiency.

It is further an object of the present invention to provide an electromagnetic auxiliary exhausting device enabling a two-stroke gasoline engine to have an improved combustion efficiency.

According to the present invention, an electromagnetic auxiliary exhausting valve includes an electromagnetic valve having a movable valve needle componet having a first seat surface, an immovable valve body having a second corresponding seat surface, a spring for tightly matching the seat surfaces against each other, and a coil energizable to result in an electromagnetic force capable of overcoming the spring force, an actuator capable of outputting a specific current pulse to energize the coil, and a controller responsive to an operating condition of the engine for so controlling the actuator that the actuator desiredly outputs the specific current pulse.

The present invention may best be understood through the following description with reference to the accompanying drawings, in which:

DETAILED DESCRIPTION OF THE PREFERRED EMBODIMENT

Figure 1A:
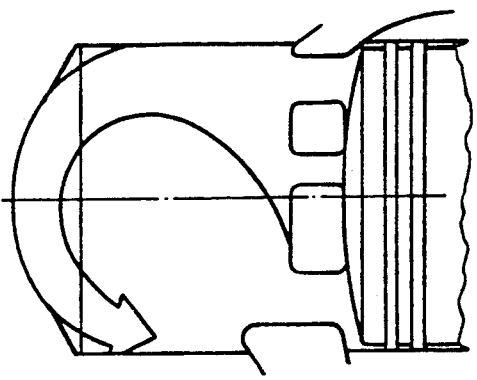
FIG. 1A is a sectional view showing a loop-scavenging engine and a new air or mixture flow therein.
Figure 1B:
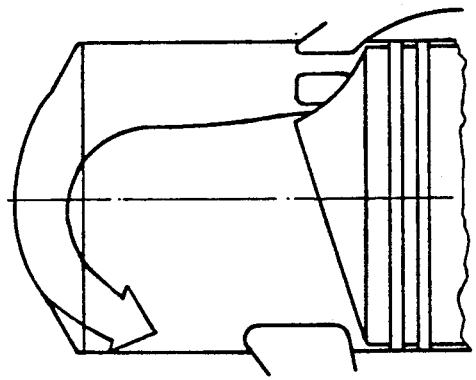
FIG. 1B is a schematical view showing a new air or mixture flow in a cross-scavenging engine.
Figure 1C:
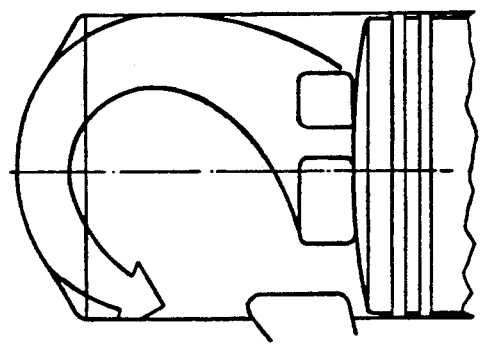
FIG. 1C is a schematical view showing a new air or mixture flow in a mixed type engine.
Figure 2B:
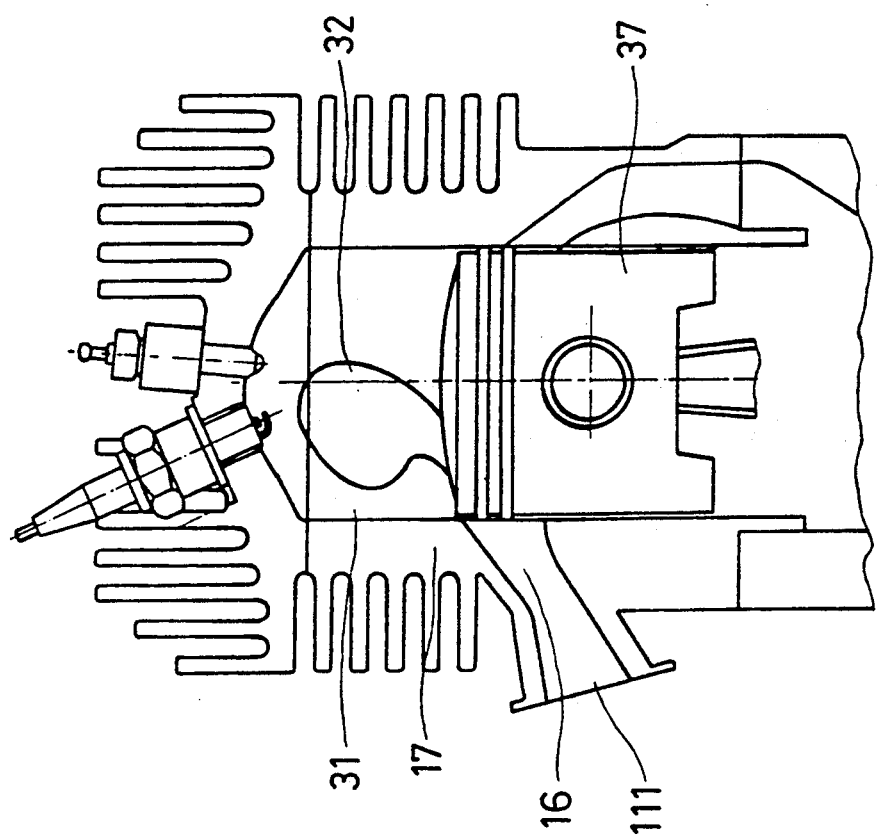
FIGS. 2A and 2B schematically show the intake air or mixture flow in a two-stroke engine under a high load.
Figure 2A:
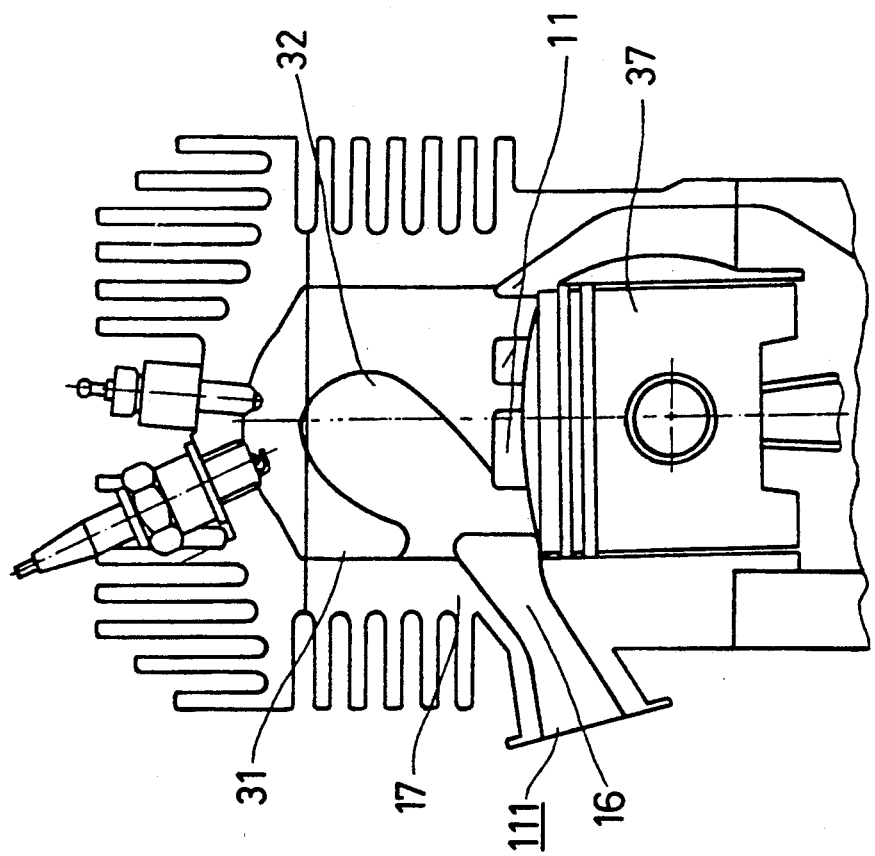
Figure 3B:
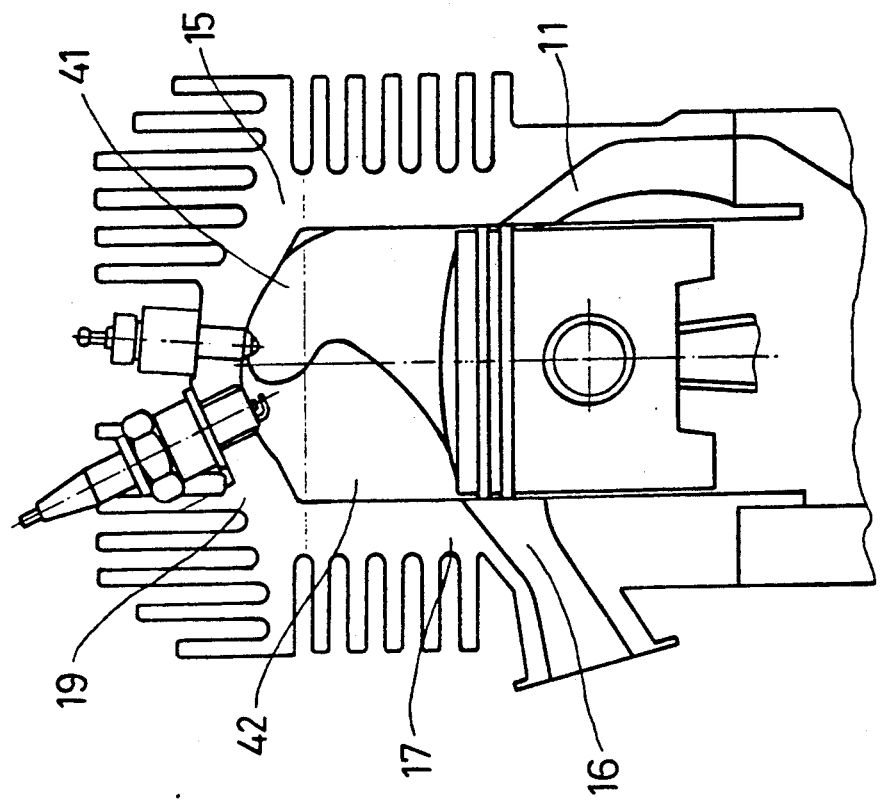
FIGS. 3A and 3B schematically show the intake air or mixture flow in a two-stroke engine under a relatively low load.
Figure 3A:
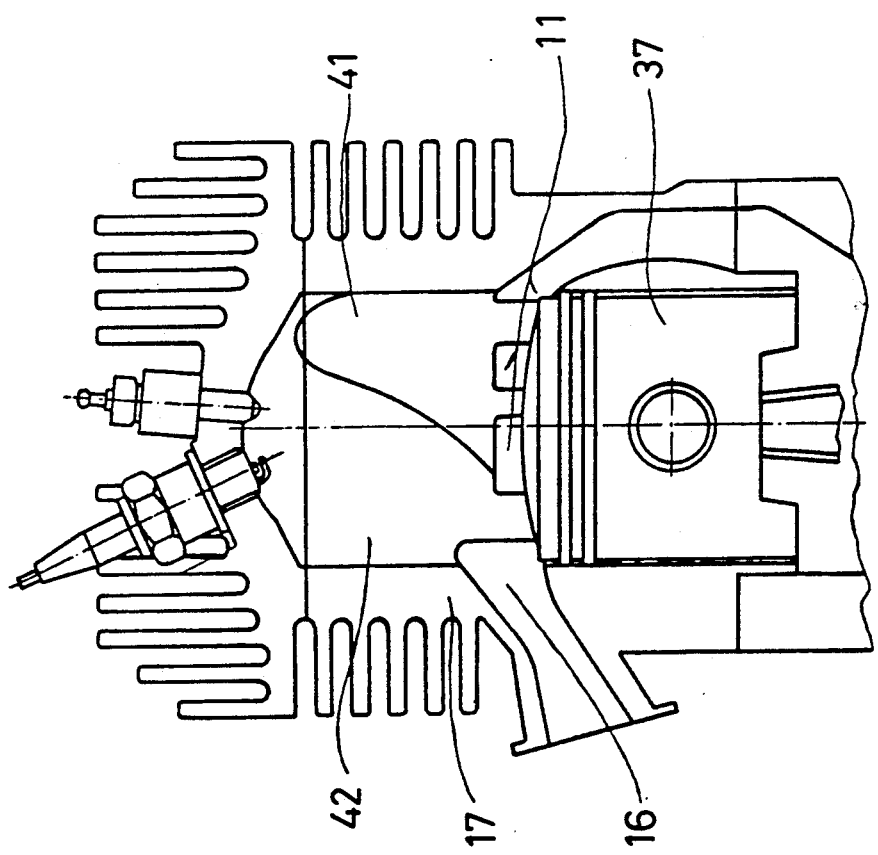

Referring now to FIGS. 4A–6, a preferred embodiment of an electromagnetic auxiliary exhausting device according to the present invention includes an electromagnetic valve 18 inserted into an auxiliary exhausting port 112 provided on the engine cylinder, an auxiliary exhausting pipe 68 connected between electromagnetic valve 18 and the main exhaust pipe 111, a solenoid driver 50 electrically connected to valve 18, and a controller 601 controlling solenoid 50.

Electromagnetic valve 18 includes a valve needle component 60, a valve body 63, a stator 64, a compression spring 69, a coil 65, a housing 66 and an end plate 661. Needle component 60 includes an armature 61 and a needle 62 having a first end fixed to armature 61 and a second opposite enlarged end 622 having a first conical seat surface 621. Stator 64 is fixed in housing 66 partly fixing therein valve body 63 projecting beyond housing 66 to be fixed to the engine cylinder. Needle 62 slidably passes through stator 64 and valve body 63 which includes a central room 632 formed around needle 62, passages 633 communicating auxiliary pipe 68 with port 112, and a lower conical seat surface 631 tightly matchable against seat surface 621. Spring 69 is mounted between stator 64 and armature 61 for always tending to bias them to depart from each other or to match seat surfaces 621 and 631 against each other. Coil 65 wound around armature 61 and stator 64 is mounted in housing 66 attaching thereto end plate 661. Armature 61, stator 64, housing 66 and end plate 661 are all made of a maagnetic material.

Solenoid driver 50 can output a specific current pulse to energize coil 65 for operating electromagnetic valve 18. Controller 601 responsive to the engine operating conditions, e.g. the engine r.p.m., the crankshaft angle and the throttle position controls driver 50 in a manner that driver 50 desiredly outputs the specific current pulse.

Figure 7:
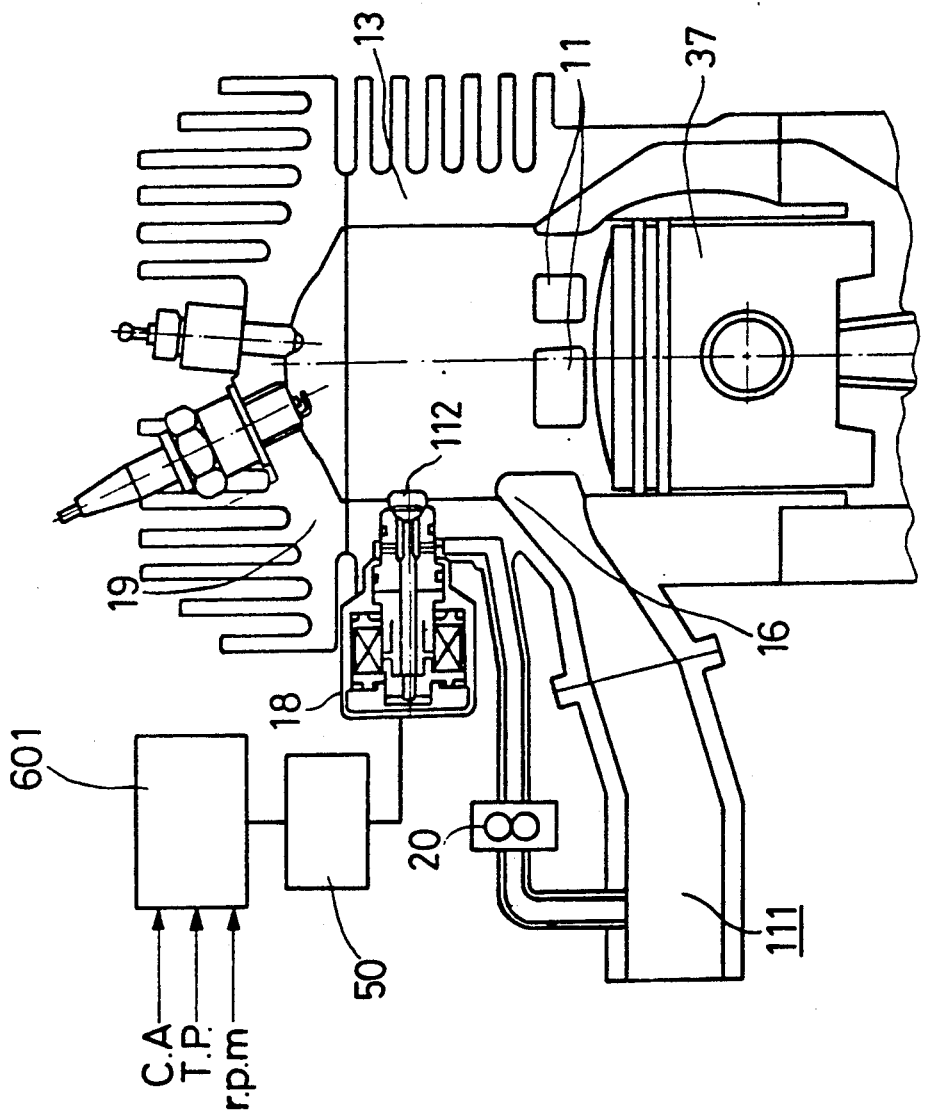
FIG. 7 is a sectional view showing that a two-stroke engine incorporating thereon an electromagnetic auxiliary exhausting device in FIG. 4A incorporates thereto a suction pump.

As shown in FIG. 7, auxiliary exhausting pipe 68 can mount thereto a suction pump 20 for assisting the exhausting of the residual gas off the engine cylinder.

The presented electromagnetic valve 18 can be mounted on the cylinder side wall 17 above the exhaust port 16 or alternatively on the peripheral wall 19 of the cylinder head in order to effectively reduce the quantity of the residual gas in the cylinder for improving the scavenging efficiency for the engine.

Figure 4B:
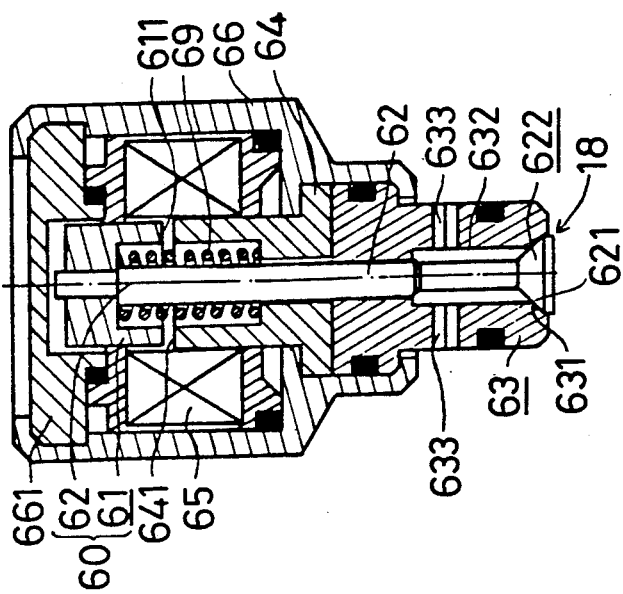
FIG. 4B is a sectional view showing an electromagnetic valve of an electromagnetic auxiliary exhausting device in FIG. 4A.
Figure 4A:
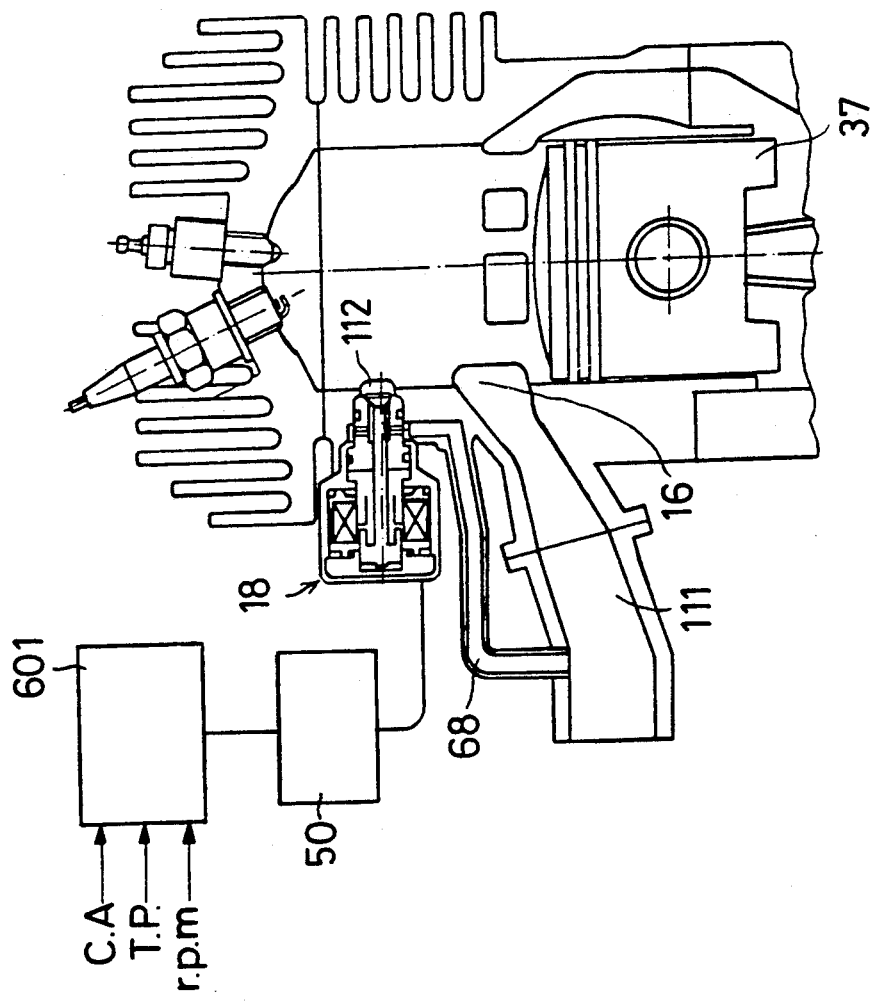
FIG. 4A is a sectional view showing a first preferred embodiment of an electromagnetic auxiliary exhausting device for a two-stroke engine according to the present invention.

The operations of the present invention are as follows:

When coil 65 is energized to create a magnetomotive force, armature 61, stator 64, housing 66 and end plate 661 being all made of a magnetic material from thereamong a circuit of magnetic flux to generate an attractive force drawing armature 61 and stator 64 toward each other. When the attractive force is larger than the preloaded force on spring 69, armature 61 and needle 62 will downwardly move until the bottom surface 611 of armature 61 is stopped against by the top surface 641 of stator 64 which in return means that seat surface 621 of needle 62 departs away from seat surface 631 of valve body 63 so that the exhaust gas in the cylinder can pass through port 112, the space formed between seat surfaces 621 and 631, central room 632, passages 633 and auxiliary pipe 68 to be discharged into main exhaust pipe 111. In practical application, auxiliary pipe 68 can be directly coupled to main pipe 111 as shown in FIG. 4A so that the upwardly moving piston 37 can compress the exhaust gas in the cylinder near port 112 to be discharged through electromagnetic valve 18 out of the cylinder. Alternatively, auxiliary pipe 68 can mount thereto a suction pump 20 as shown in FIG. 7 so that valve 18 can exhaust therethrough a relatively large amount of exhaust gas within a short time period.

When coil 65 is deenergized, the attractive force between armature 61 and stator 64 will soon get disappeared. When the spring force effected by spring 69 is larger than the residual magnetic force resulted by the magnetic hysteresis, spring 69 tightly matches seat surfaces 621 and 632 against each other again which means that central room 632 is no more in communication with auxiliary port 112 or valve 18 is closed.

It can therefore be known that if one can set the initial time, the final time and the pulse width of the current pulse fed into electromagnetic valve 18, he can accordingly control the opening time, the closing time and the opening duration of vavle 18. Since the current pulse is generated in actuator 50, actuator 50 can have the circuitry thereof been designed to be capable of generating a specific pulse waveform enabling needle 62 to havee a rapidly responsive characteristic. Controller 601 responsive to the engine r.p.m., the throttle position and the crankshaft angle controls when actuator 50 should output the specific current pulse by means of a control signal of a 5 V voltaage pulse being well-known in the prior control technique.

Figure 5:
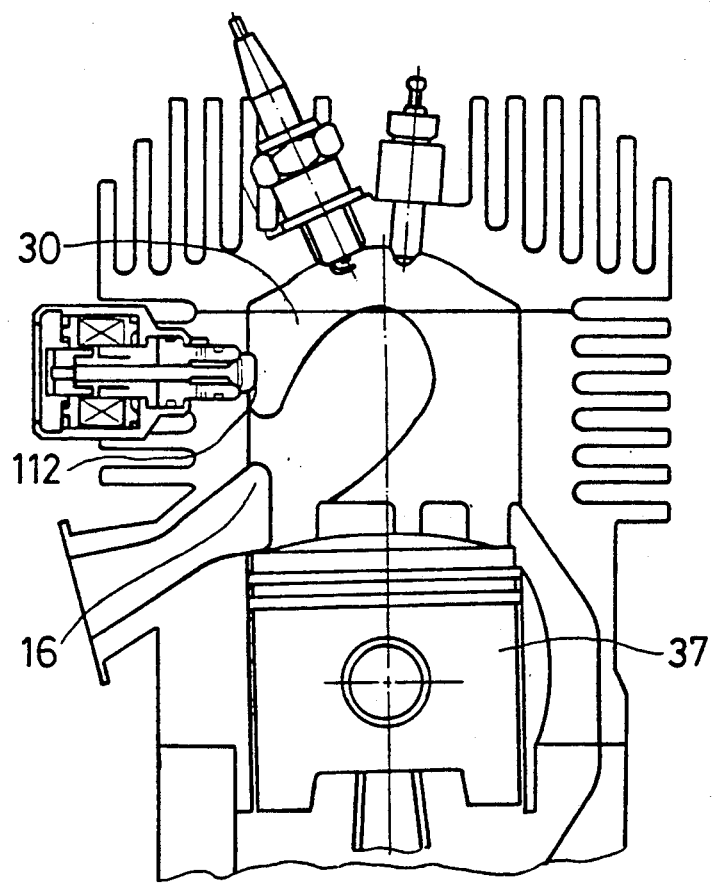
FIG. 5 schematically shows that a two-stroke engine incorporating thereon an electromagnetic auxiliary exhausting device in FIG. 4A is scavenging under a relatively high load.
Figure 6:
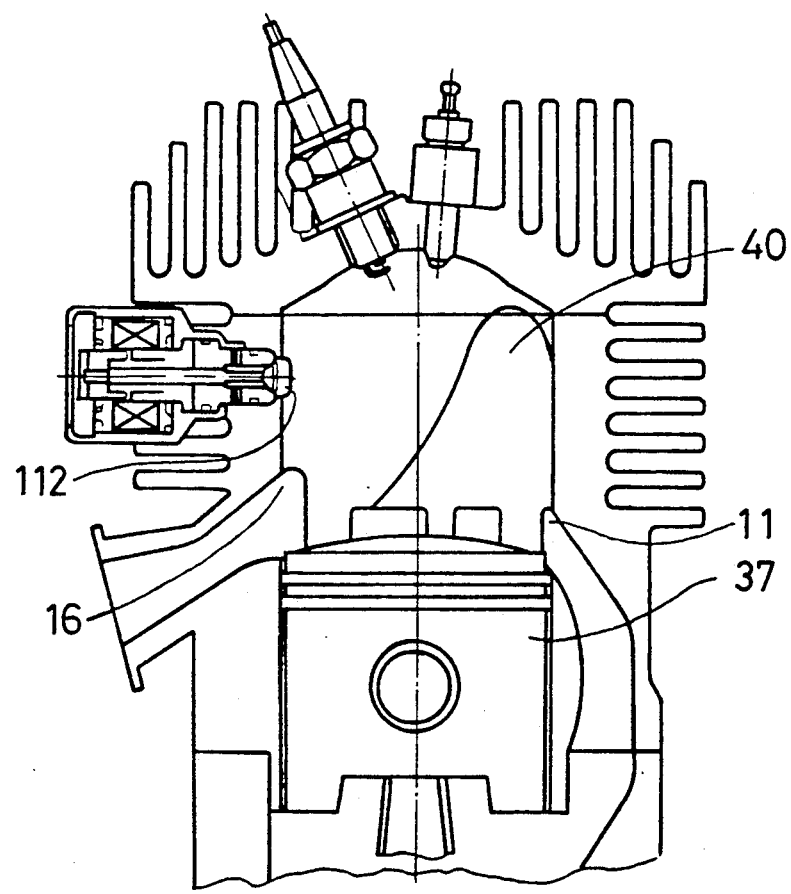
FIG. 6 schematically shows that a two-stroke engine incorporating thereon an electromagnetic auxiliary exhausting device in FIG. 4A is scavenging under a relatively low load.

Generally speaking, electromagnetic valve 18 can be opened at the time exhausting port 16 is closed. In practical application, the time valve 18 is opened can be made earlier at the time after scavenging ports 11 are entirely closed which means that ports 112 and 16 can simultaneously discharge the exhaust gas between the time scavenging ports 11 are closed and the time port 16 is closed. The time electromagnetic valve 18 should be closed is determined by when the intake new air will reach the area adjacent port 112 which in turn is determined by the engine load and the engine r.p.m.. That is, if there is a relatively strong new air flow 30 as schematically shown in FIG. 5 under a high engine load, valve 18 should always or early be closed in order to avoid the "short-circuittiing loss" and if there is a relatively weak new air flow 40 as schematically shown in FIG. 6 under a low engine load, valve 18 can be closed after piston 37 has closed port 112 to ensure that a best scavenging efficiency is obtained.

Port 112 with which scavenging ports 11 are oreferably symmetrically provided on the cylinder wall should be provided on side wall 17 above port 16 but can be optimally positioned only when one considers whether it resides at the projective center of the exhaust gas region in the engine cylinder in order to obtain a preferable scavenging efficiency.

In sum, the present electromagnetic auxiliary exhausting device has the following advantages:

1) Under an engine low load operation, the present electromagnetic auxiliary exhausting device can improve the scavenging efficiency or increase the purity P(=the fresh air volume+the exhaust gas volume) of the air in the cylinder so that the probability of the misfire of mixture is reduced and a rapid combustion rate is obtained in order that under a low load, a two-stroke gasoline engine still can have a combustion efficiency approximately equivalent to that of a 4-stroke gasoline engine.

2) The present invention can also be introduced into the fuel injection application in order to avoid the short-circuitting loss of the unburn fuel-air mixture under a relatively high engine load.

3) In order to incorporate therein the present auxiliary device, a two-stroke engine needs not have the basic structure thereof been changed.

4) The complicated valve mechanism is conventionally thought to be provided on the cylinder head thus inevitably having an increased height and volume as a 4-stroke engine cylinder head normally has. Since the present electromagnetic auxiliary exhausting device can be provided on the cylinder side wall, a cylinder incorporating thereon the present device can still have a structurally simple head having a normal low height which is important for a car to have a low drag coefficient.

5) The operation of the conventional valve mechanism for the engine cylinder is independent from the operating conditions of the engine so that the cylinder cannot always have the best scavenging efficiency which is no more true foe a cylinder incorporating thereon the present electromagnetic auxiliary valve since the controller controlling the actuator actuating the electromagnetic valve is rapidly responsive to the operating conditions of the engine.

The above described embodiments are not limitative but only illustrative for the present invention and can be changed and modified by those skilled in the art without departing from the spirit and scope of the present invention which is defined in the appended claims.

What I Claim is:

1. An electromagnetic auxiliary exhausting device for a two-stroke engine including a cylinder having scavenging ports and an auxiliary exhausting port closer to the top of the cylinder than the scavenging ports, comprising:

an electromagnetic valve inserted into said auxiliary port, and including a movable valve needle component having a first seat surface, an immovable valve body having a second corresponding seat surface, a spring mounted between said needle component and said valve body for tightly matching said seat surfaces against each other so that no gas can exhaust through said valve out of said cylinder, and a coil wound around said needle component in a manner that when energized to result in an electromagnetic force capable of overcoming a spring force effected by said spring, said seat surfaces will depart from each other to be ready to exhaust a gas through a space defined therebetween out of said cylinder;

an solenoid driver electrically connected to said electromagnetic valve and capable of outputting a specific current pulse to energize said coil; and a controller responsive to an operating condition of said engine for so controlling said solenoid driver that said solenoid driver desiredly outputs said specific current pulse.

2. An electromagnetic auxiliary exhausting device according to claim 1, further comprising an auxiliary exhaust pipe connected between electromagnetic valve and a primary exhaust pipe for said engine.

3. An electromagnetic auxiliary exhausting device according to claim 2 wherein said auxiliary exhaust pipe mounts thereto a suction pump for sucking thereto said gas.

4. An electromagnetic auxiliary exhausting device according to claim 2 wherein said valve body includes a passage communicating with said auxiliary pipe and communicable with said auxiliary port.

* * * * *